2 Sheets—Sheet 1.

P. BARKER,

Assignor to WINSHIP BROS.

SANDPAPERING MACHINE.

No. 9,847. Reissued Aug. 23, 1881.

Witnesses.
Franck L. Durand
John McCauley

Inventor
Peleg Barker
by Brown & Underwood
Attorneys

2 Sheets—Sheet 2.

P. BARKER,

Assignor to WINSHIP BROS.

SANDPAPERING MACHINE.

No. 9,847. Reissued Aug. 23, 1881.

Witnesses.

Franck L. Durand.

John McCauley.

Inventor

Peleg Barker by Smith & Underwood

Attorneys

UNITED STATES PATENT OFFICE.

PELEG BARKER, OF KEARNEY, NEBRASKA, ASSIGNOR TO WINSHIP BROTHERS, OF RACINE, WISCONSIN.

SANDPAPERING-MACHINE.

SPECIFICATION forming part of Reissued Letters Patent No. 9,847, dated August 23, 1881.

Original No. 178,398, dated June 6, 1876. Application for reissue filed June 10, 1881.

*To all whom it may concern:*

Be it known that I, PELEG BARKER, of Kearney, in the county of Buffalo and State of Nebraska, have invented certain new and useful Improvements in Sandpapering-Machines; and I do hereby declare the following to be a full, clear, and exact description of the same, reference being had to the accompanying drawings, and the letters of reference marked thereon, making a part of this specification.

The nature of my invention will be fully set forth hereinafter. Its objects are, first, to provide means for tilting and raising the shaft which carries the polishing-head for adjusting the latter with relation to the platform which carries the work; ~~second, exhaust mechanism~~ and means for guiding the dust into the same; third, means for supporting the polishing-head above the work and adjusting it to the work laterally; and, finally, in providing for a cutting instead of a grinding action of the polishing-head by making its face slightly conical and concaving its center.

Figure 1:
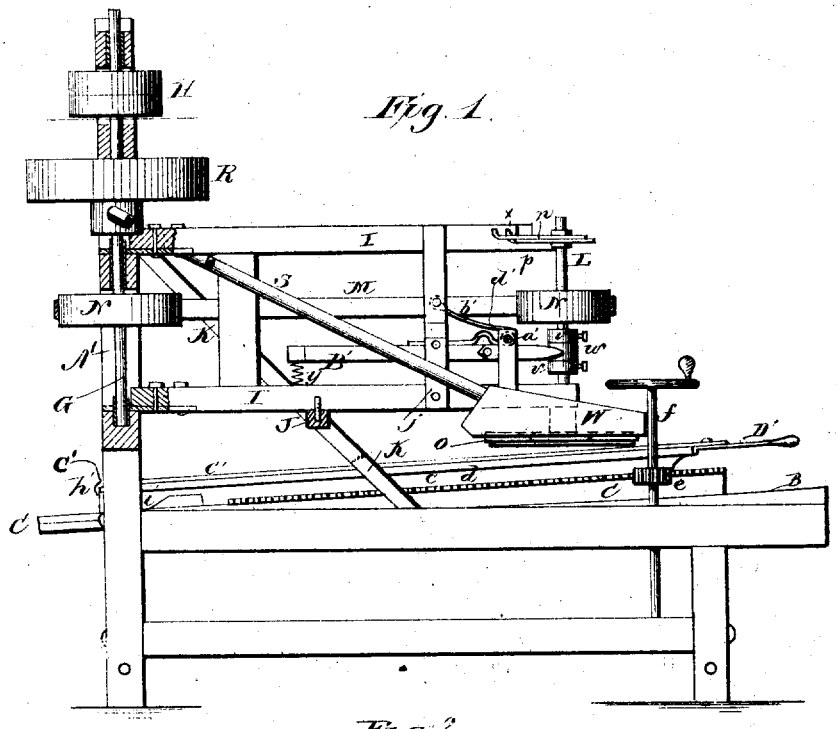
Figure 2:
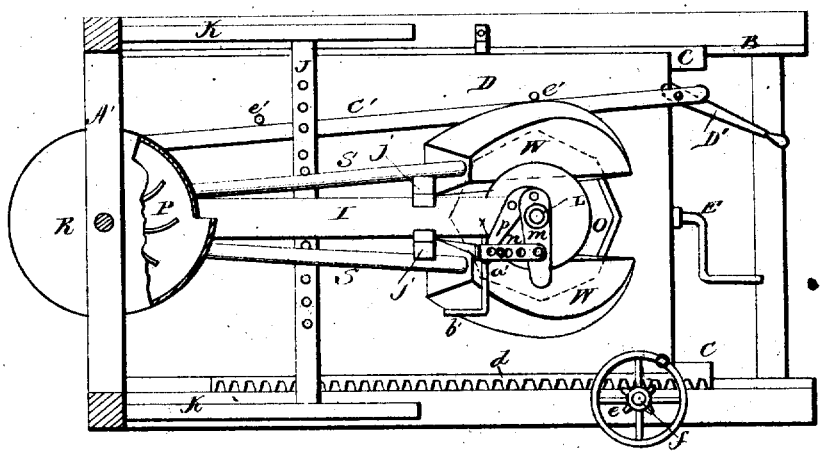
Figure 5:
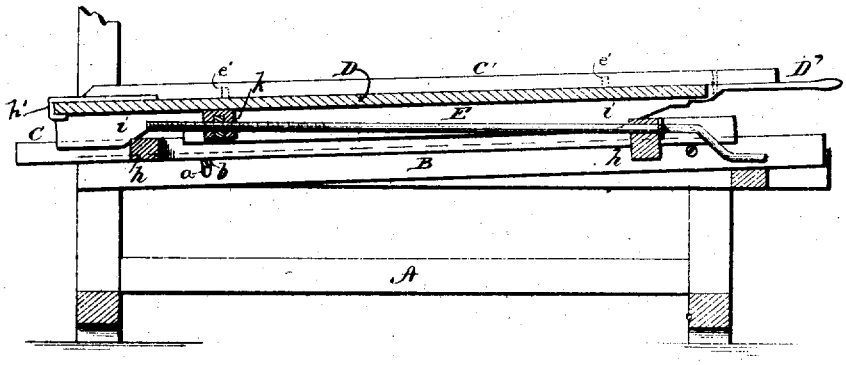
Figure 3:
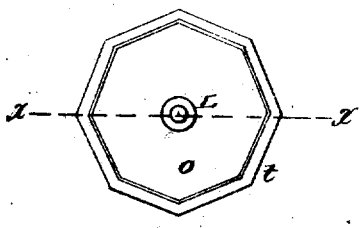
Figure 4:
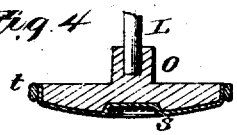
Figure 6:
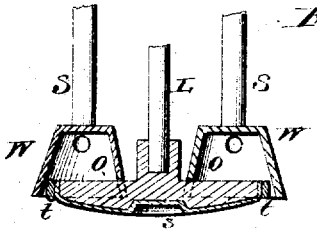

In the drawings, Figure 1 is a side elevation of my sandpapering-machine. Fig. 2 is a plan view of the same, and Figs. 3 and 4 are detail views of the polishing-head. Fig. 5 is a longitudinal section of the frame with carriage and table, and Fig. 6 is a detailed sectional view of the dust-hoods and polishing-heads.

A is the main frame of my machine, on each side of which are rails B B, pivoted at their front ends, and adapted to be adjusted to varying angles by set-screws *b*, passing through the frame and slots *a* in the rear ends of them, (the rails B B.) A carriage, C, rests upon rails B, and on cross-bars *h h* of this carriage the work-bed D is supported by inclines *i*. A crank-rod, E, passed through the front cross-bar, *h*, and through a nut, *k*, in a bar attached to the under side of the bed, serves to adjust it independently of the rails B as to its inclination. The carriage C is reciprocated by shaft *f* and a pinion, *e*, which latter engages with a rack-bar, *d*. A vertical frame, A′, rises from one end of the main frame A, and this frame supports the driving-shaft G in suitable bearings, shaft G carrying a pulley, H, by which it is revolved. A swinging frame, I, is pivoted or hinged to the shaft G, and is supported near its longitudinal center by a cross-bar, J, which is secured in inclined braces K.

The shaft L, that carries the polishing-head O, has a bearing in the lower rail of the frame I, and the upper rail has attached to it an arm, *p*, to which is pivoted a lever, *m*, which carries the upper bearing of the shaft L. A perforated bar, *n*, connects the outer end of lever *m* with that of arm *p*, and the two are adjusted to each other by pin *x*.

To a bar, *j*, of the frame I, I pivot a lever, B′, that is forked and pronged at its front end to grasp the loose collar *w*, held between the collars *v v* on shaft L, so that it acts as a fulcrum upon which the shaft is tilted ~~to change~~ the inclination of the polishing-head when the lever *m* is turned upon its pivot. A spring, *y*, serves to draw the free arm of lever B′ down, while a shaft, *a′*, having a handle, *b′*, and eccentric *d′*, (the latter shown in dotted lines in Fig. 1,) serve to depress its front end, and with it the shaft L and polishing-head.

The shaft G carries a fan, P, which revolves in a stationary case, R, from which latter two draft-tubes, S S, extend forward and downward to two hoods, W W, that encompass the polishing-head, to receive the dust from the work. The draft-tubes are firmly supported and secured to the frame I by posts or bars *j j*.

The polishing-heads O have slightly-conical faces, whereby a plane surface may always be presented to the work as it is carried up to it on an incline, and instead of the surface being ground, it is cut or sheared off smoothly, without grooves or ridges being left. At the center of the polishing-face I make a concavity, *s*, for if I did not at that point there would be a dead-center that would grind and disfigure the work. Of course the head O is covered with sand or emery paper when ready for use, preferably secured to the head O by band *t*.

Operation: The article to be smoothed is placed upon the bed D against two pins, *e′ e′*, and held by means of a bar, C′. The bed is then adjusted to the desired height and inclination, a belt on pulley H serving to drive the shaft G, from which power is transmitted to shaft L by pulleys N N and belt M. The attendant may now give the polishing-head the proper inclination by adjusting the lever *m* in or out, and he may then depress the head O by turning crank *b'* of shaft *a* to regulate the pressure of the head on the work. As the surface of the work is taken off, the dust produced is carried up the tubes S S by the exhaust, the conical face of the head O permitting a free passage of dust from under it.

I claim as my invention—

1. In a sandpapering-machine, the combination, with the main frame, of adjustable side rails, pivoted at one end and capable of being raised or lowered at the other, movable carriage, and adjustable bed, as set forth.

2. The shaft L, carrying the polishing-head, in combination with the pivoted lever *m* and arms *n* and *p*, as set forth.

3. The tilting shaft L, carrying loose collar *w*, in combination with the lever B', crank-shaft *a'*, eccentric *d'*, and spring *y*, and with the pivoted lever *m* and arms *n* and *p*, as set forth.

4. The combination, in a sandpapering-machine, of the tilting shaft L, carrying the polishing-head O, with an adjustable bed for supporting the material to be smoothed, as set forth.

5. A polishing-head having a conical face and central concavity, *s*, as set forth.

6. The combination, in a sandpapering-machine, of the tilting shaft L, carrying the conical-faced polishing-head O, with the hoods W W, arranged one on each side of the shaft L, and each provided with draft-tube S and the exhaust R, as set forth.

7. The combination, in a sandpapering-machine, of a movable bed, an adjustable shaft capable of being placed at any angle desired with the bed, and a conical-faced polishing-head secured on said shaft, as set forth.

8. The combination of the adjustable bed D, having pins *e' e'*, rails B B, and movable carriage C, with the adjustable bar C', having hook *h'* at one end and bent lever D' at the other end, as set forth.

9. The combination of the rails B B, movable carriage C, having cross-bars *h h* and rack-bar *d* secured thereto, and crank-shaft *f*, having pinion *c*, with the adjustable bed D, provided with inclines *i i*, and the screw-rod E and nut *k*, as set forth.

PELEG BARKER.

Witnesses:
C. H. GEORGE,
M. B. FOOTE.